US006904386B2

(12) United States Patent
Mylaraswamy

(10) Patent No.: US 6,904,386 B2
(45) Date of Patent: Jun. 7, 2005

(54) CONTROL SYSTEM AND METHOD FOR DETECTING PLUGGING IN DIFFERENTIAL PRESSURE CELLS

(75) Inventor: Dinkar Mylaraswamy, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 83 days.

(21) Appl. No.: 10/265,988

(22) Filed: Oct. 7, 2002

(65) Prior Publication Data

US 2004/0068392 A1 Apr. 8, 2004

(51) Int. Cl.[7] ............................................. G01L 15/00
(52) U.S. Cl. ..................... 702/183; 702/50; 702/47; 340/608; 73/61.73
(58) Field of Search ........................... 702/183, 45, 47, 702/50, 51, 55, 75, 100, 114, 124, 138, 140, 182, 185, 189, 198; 73/1.16, 1.17, 1.35, 1.57, 1.59, 1.63, 1.73, 40, 40.5 R, 61.73, 861.02, 861.03, 861.356, 195, 196, 861.52, 861.42–861.46, 861.61, 521, 861.64, 708, 712; 340/606, 607, 608, 611, 612, 614, 626; 137/557–559, 551, 554

(56) References Cited

U.S. PATENT DOCUMENTS

| 2,057,767 | A | | 9/1936 | Collins .......................... 73/205 |
| 4,231,262 | A | | 11/1980 | Boll et al. ................. 73/861.04 |
| 4,528,847 | A | | 7/1985 | Halmi ............................ 73/195 |
| 4,654,813 | A | | 3/1987 | Edlund et al. ................ 364/571 |
| 5,442,551 | A | * | 8/1995 | Denz et al. ..................... 701/29 |
| 5,461,912 | A | | 10/1995 | Gohara ........................... 73/202 |
| 5,680,109 | A | * | 10/1997 | Lowe et al. .................. 340/608 |
| 5,708,211 | A | | 1/1998 | Jepson et al. ............. 73/861.04 |
| 5,739,429 | A | | 4/1998 | Schmitkons et al. ............ 73/196 |
| 5,763,764 | A | | 6/1998 | Mieczkowski et al. ........ 73/40 |
| 5,905,208 | A | | 5/1999 | Ortiz et al. ............... 73/861.42 |
| 6,021,677 | A | | 2/2000 | Hepner ..................... 73/861.42 |
| 6,526,358 | B1 | * | 2/2003 | Mathews, Jr. et al. ......... 702/51 |
| 6,654,697 | B1 | * | 11/2003 | Eryurek et al. ................ 702/47 |

FOREIGN PATENT DOCUMENTS

| JP | 04328435 A | 11/1992 |
| JP | 06109511 A | 4/1994 |
| JP | 08136386 A | 5/1996 |
| JP | 08166309 A | 6/1996 |
| WO | WO 97/45716 | 12/1997 |

OTHER PUBLICATIONS

Taya et al., "Detecting blockage in process connections of differential pressure transmitters", Jul. 26–28, 1995, IEEE, SICE'95, Proceedings of the 34th SICE Annual Conference, pp. 1605–1608.*

* cited by examiner

*Primary Examiner*—Hal Wachsman
(74) *Attorney, Agent, or Firm*—Ohlandt, Greeley, Ruggiero & Perle, L.L.P.

(57) ABSTRACT

A method and control system is disclosed that monitors the high frequency or commonly referred to as the "noise" component of a measurement signal to detect plugging conditions in fluid flow systems monitored by DP-cell based sensors. This high frequency component has contributions from the process factors like disturbances, user actions and random effects like turbulence. A test statistic θ(t) has been developed that monitors the proportion of variance introduced by process factors and random effects. By monitoring this proportion, it is possible to detect a frozen sensor that is characterized by a dramatic reduction in the variance due to process factors over a sufficiently long detection window. The method works with measurements sampled at frequencies commonly achievable in a process environment.

13 Claims, 12 Drawing Sheets

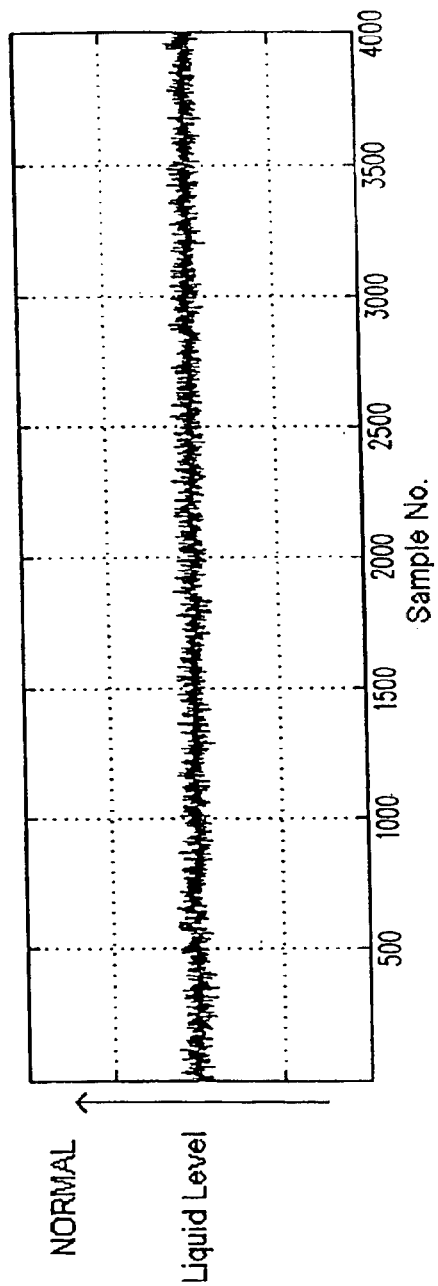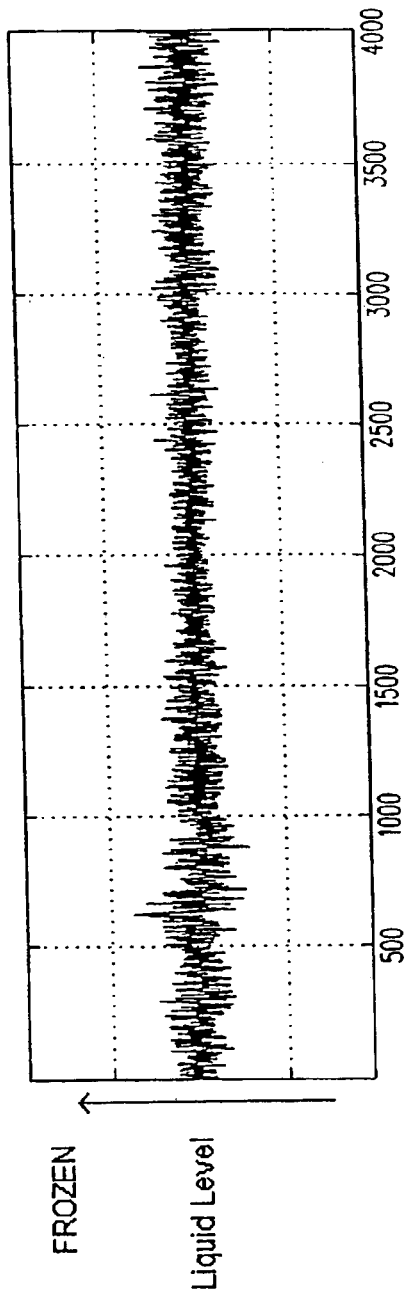

CONTROL SYSTEM AND METHOD FOR DETECTING PLUGGING IN DIFFERENTIAL PRESSURE CELLS

FIELD OF THE INVENTION

This invention relates to a control system and method for detecting plugging in differential pressure cells.

BACKGROUND OF THE INVENTION

Sensors that provide accurate and reliable measurements are crucial in today's world of highly automated and integrated operations. Sensor failure is one of the biggest nightmares of an operator. A sensor failure is defined as the loss of proper sensing action, that is, the sensor fails to respond correctly to changes in the measurement variable it is sensing. Often a sensor failure goes undetected until it escalates into a process problem. It may then be too late to take any preventive action. The process industry is filled with real-life case studies, in which a catastrophic incident can be traced back to a failed sensor.

A differential pressure cell (DP-cell) is commonly used to measure process variables like flow and level. The DP-cell is often located close to the ground for ease of maintenance and, hence, is connected to the process through long impulse lines. These impulse lines are easily blocked by accumulation of suspended particles in the process fluid, or by uneven steam flow during tracing, or by poor insulation. As used herein, the term "frozen sensor" is used to indicate the state of a sensor (either flow or level) that contains a blocked DP-cell. A blocked DP-cell measures incorrect pressure and, thus, provides an incorrect indication of flow or level. Unlike the failure of a temperature sensor that results in the measurement reading either pegged at a constant value or widely oscillating between lower and upper limits of a range of the instrument, a frozen sensor is more subtle to detect.

Traditionally, there are two ways of detecting a frozen sensor. First, an operator may suspect a frozen sensor based on his or her experience. Second, a spectral analysis may be performed to monitor changes in the high-frequency component of a measurement signal. Pressure p(t) described at a molecular level measures the net energy transferred by random impact of atoms and molecules at any point. The pressure p(t) at any time t is given by:

$$p(t) = \bar{p}(t) + p'(t) \qquad (1)$$

where, p'(t) represents fluctuations introduced because of turbulence and electrical interference and $\bar{p}(t)$ represents the ensemble average of the instantaneous pressure calculated over a very small measurement volume. These fluctuating components of a measurement signal can often provide valuable insights into the state of the measuring device. Although the use of spectral analysis to monitor these fluctuations and deduce diagnostic states has been successful in laboratory setups, most methods require measurement frequencies in the range of 200–1000 Hz, which is rarely practical in process industries.

Thus, there is a need for an automated and predictive plugging detection system and method.

SUMMARY OF THE INVENTION

The method of the present invention detects a plugging condition in the impulse lines of a DP-cell. The DP-cell provides a sensor signal proportional to the pressure drop and, hence, the velocity of a fluid in a system. A variance factor is developed for the variance of a fluctuating component of the sensor signal that is mainly due to turbulence effects of the fluid; compared with a baseline value using a predetermined threshold. An occurrence of the plugging condition is signaled in response to the change in this variance factor.

The method of the invention works with well-established and prevalent sampling rates as compared to frequency based methods that require high sampling rates. Thus, the method can be deployed within established distributed control systems without changing sampling rates or data collection frequency.

According to one embodiment of the method of the invention, the sensor signal is also processed to detect a zero mean velocity condition of the fluid. The occurrence of the plugging condition is signaled when the variance factor and a non-zero mean velocity condition are developed simultaneously.

According to another embodiment of the method of the invention, the comparison is with a current value of the sensor signal, and a baseline value based on a value of the sensor signal that is calculated earlier in time than the current value. Preferably, the baseline value is dynamically updated.

According to another embodiment of the method of the invention, the current value is based on a window of N samples of the sensor signal that advances at least one sample at a time to provide a plurality of windows. The comparison of the current value and the baseline value is repeated for each of the plurality of windows. The baseline value is dynamically updated preferably based on a value of the baseline developed prior to the window of the current value. More preferably, the baseline value is updated during each of the windows over a detection window that spans a plurality of the sample windows. Most preferably, the baseline value is updated using an exponentially weighted moving average of the plurality of sample windows.

According to another embodiment of the method of the present invention, the variance factor uses only the high frequency component of the sensor signal. Preferably, the variance factor closely corresponds to turbulence effects and substantially eliminates effects due to low frequency process effects. Comparing the variance factor with the baseline value substantially eliminates effects due to working conditions of the system.

According to another embodiment of the method of the invention, the variance factor is compared to with a baseline value and a predetermined threshold. An occurrence of the plugging condition is signaled in response to the variance factor. The baseline value is dynamically updated.

The control system of the present invention includes a controller that comprises a processor, a memory and a program that causes the processor to perform a plurality of operations that correspond to the steps of the method of the invention.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIGS. 6–9 depict traces of normal and frozen DP-cell based sensors;

DESCRIPTION OF THE PREFERRED EMBODIMENT

According to the present invention, a test statistic is developed that measures the variance of fluctuating (high frequency) components of a sensor signal that is monitored to provide insights into the diagnostic state of the sensor. Unlike conventional statistical hypothesis testing, domain knowledge in terms of the actual sensor model is used. A 2×2 covariance matrix is constructed for the measurement of the variance introduced due to turbulence and process effects. The eigen values of this covariance matrix are monitored to provide diagnostic information. By way of example, the method of the invention is illustrated using historical data from a level sensor in a petrochemical plant. For this example, the method of the invention is capable of detecting a frozen level sensor hours before it results in a process upset.

Figure 1:
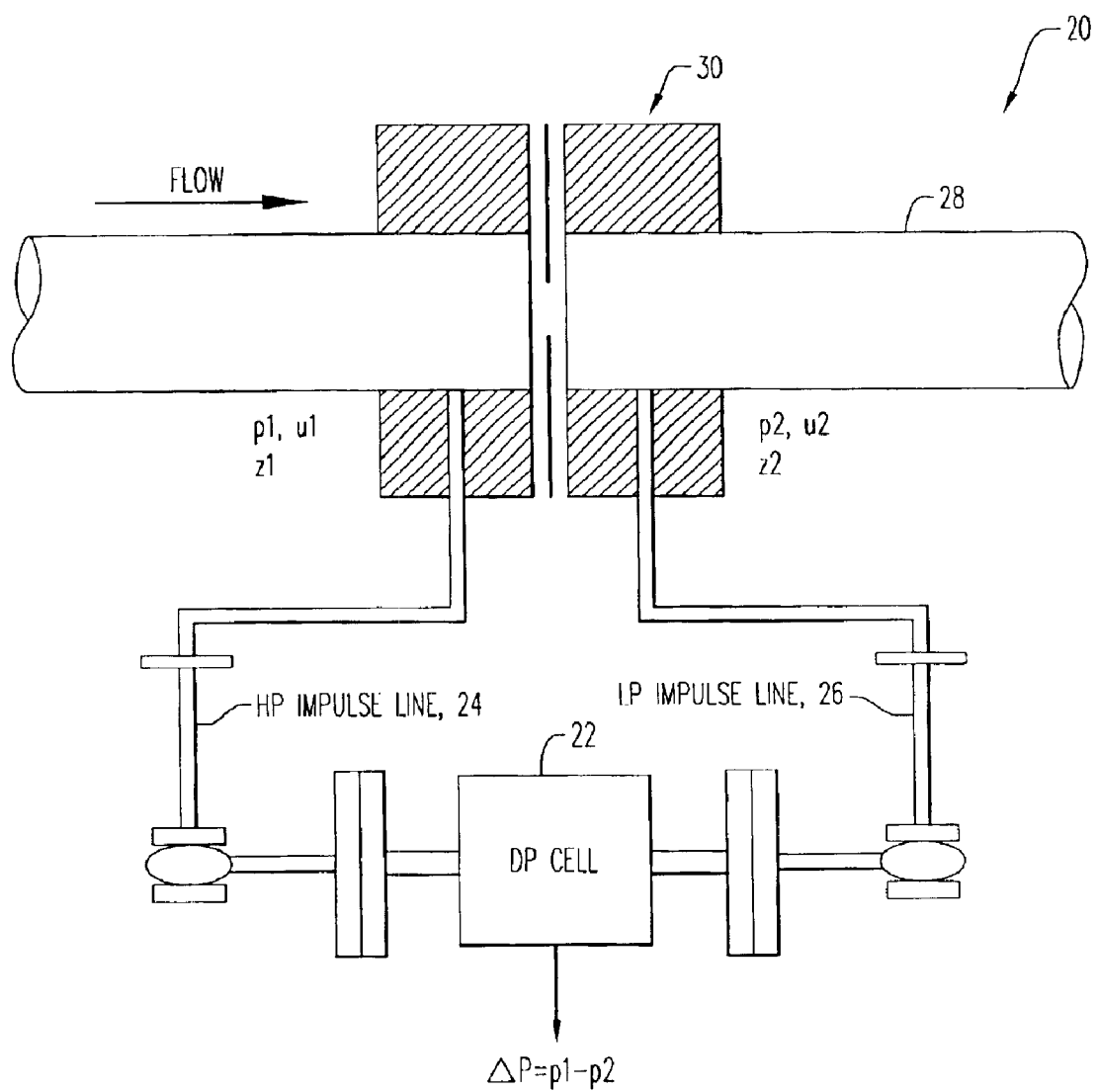
FIG. 1 is a schematic diagram of a control system of the present invention for measuring fluid flow and/or level.

Referring to FIG. 1, a measurement system 20 includes a DP-cell 22 that is connected via a pair of impulse lines 24 and 26 to a pair of spaced apart points on a pipe 28 to measure the flow of a fluid therethrough. A flange arrangement 30 is disposed on pipe 28 to facilitate the connection of impulse lines 24 and 26 to pipe 28. For the indicated flow direction, impulse line 24 is a high-pressure line and impulse line 26 is a low pressure line. The fluid pressure, velocity and elevation on the high pressure side are denoted by $p1$, $u1$ and $z1$, respectively. The fluid pressure, velocity and elevation on the low-pressure side are denoted by $p2$, $u2$ and $z2$, respectively. First and second flange arrangements each disposed on a respective impulse line 24 and 26 flank DP-cell 22. The first and second flange arrangements operate to facilitate the service of DP-cell 22. DP-cell 22 is operative to provide a pressure signal that is a difference between $p1$ and $p2$. According to Bernoulli, the pressure drop $p1-p2$ can be modeled as:

$$p1-p2 = \rho/2(u2^2 - u1^2) + \rho(z2 - z1) \qquad (2)$$

where $\rho$ is the average density.

Figure 2:
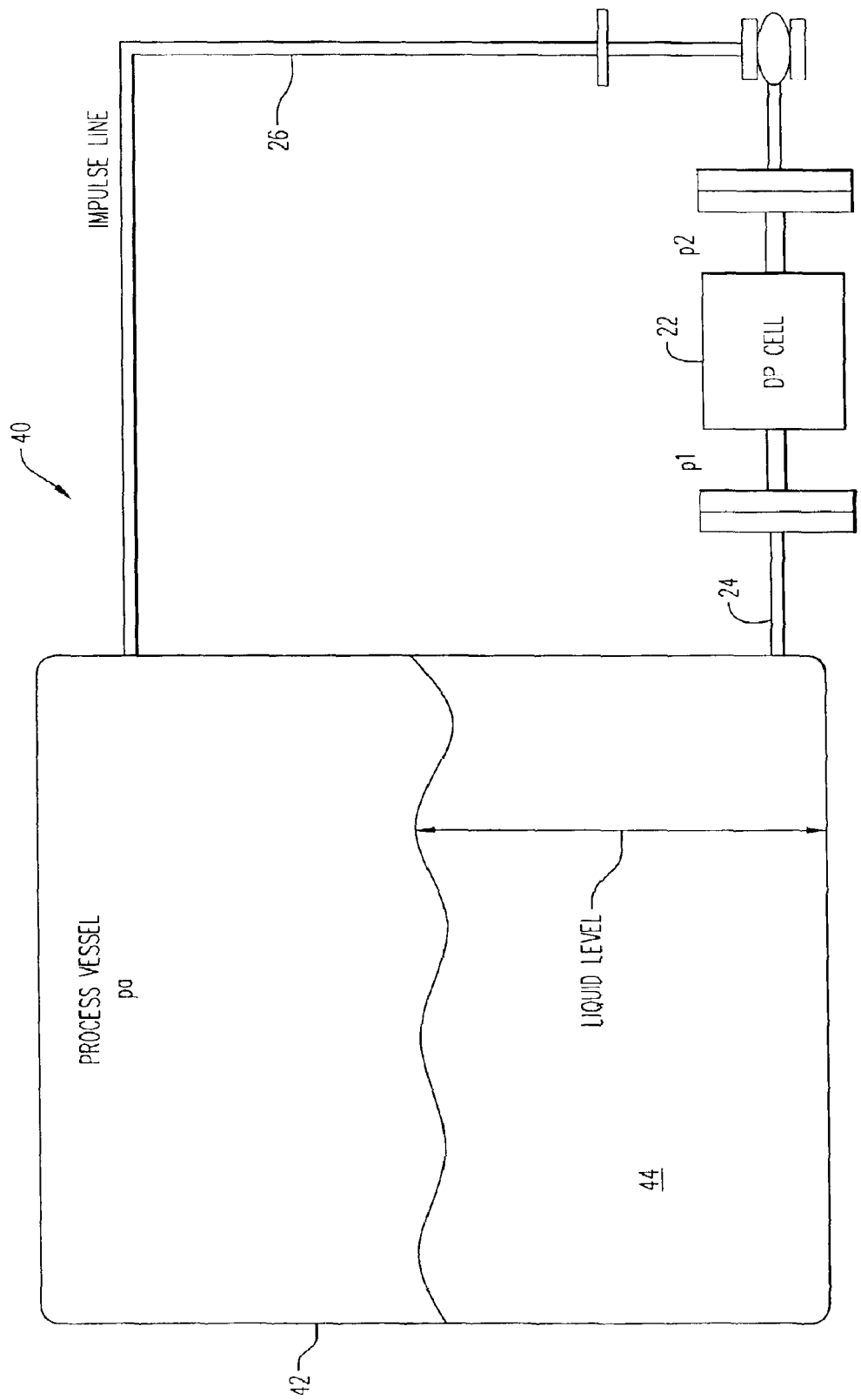
FIG. 2 is a schematic diagram of a control system for measuring and/or maintaining liquid level in a process vessel.

Referring to FIG. 2, another test setup 40 includes a DP-cell 22 that is connected via impulse lines 24 and 26 to a pair of spaced apart points on a process vessel 42 for the measurement of a level of liquid 44 contained in process vessel 42. Impulse line 24 is connected to process vessel 42 in the liquid containing portion of thereof, and preferably near the bottom of process vessel 42. Impulse line 26 is connected to a vapor containing portion of process vessel 22.

Figure 3:
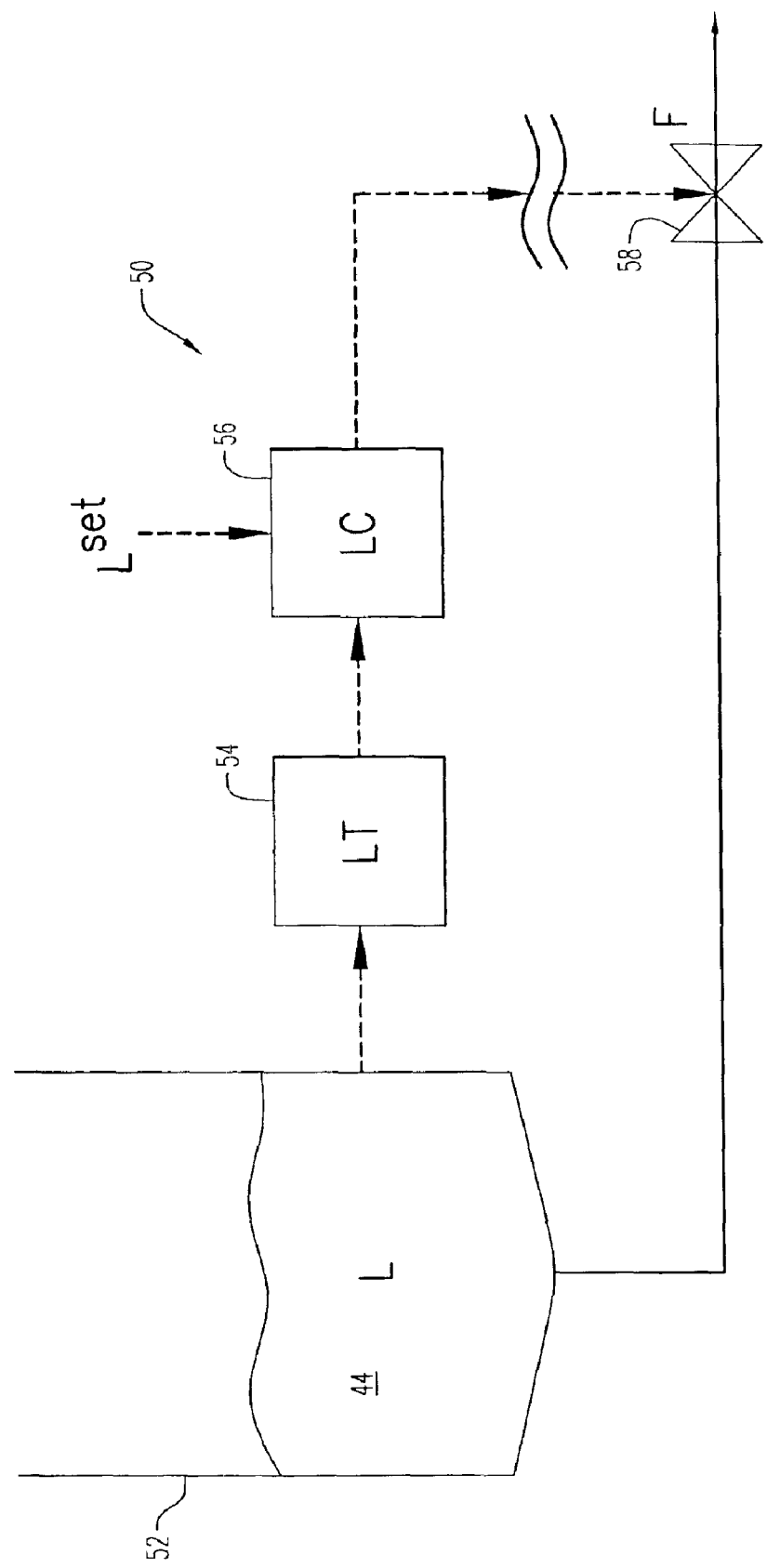
FIG. 3 is a schematic diagram showing more detail of the control system of FIG. 2.

Referring to FIG. 3, a level maintenance system 50 includes a liquid distillation column 52 (or any drum for that matter) that is interconnected with a sensor 54, a level controller 56 and a drain valve 58 for the maintenance of the level of liquid 44 at a desired level in distillation column 52. Sensor 54 is a DP-cell based sensor that provides an output signal proportional to a difference in pressure between the liquid containing portion and the vapor containing portion of column 52. It also converts the pressure difference signal to a level signal. Level controller 56 compares the level signal from the level transmitter 54 to a level set point. Level controller 56 provides an output signal to valve 58 to control drainage of liquid 44 from column 52 to maintain the level of liquid 44 at the set point level. The level set point is provided by a user or an advanced control application. Level controller 56 includes a computer with a processor, a memory and a plugging detection program that controls either the valve opening or the set point for a low-level flow regulatory controller. It also provides an indication of the plugging state of the DP-Cell contained in sensor 54.

Figure 4:
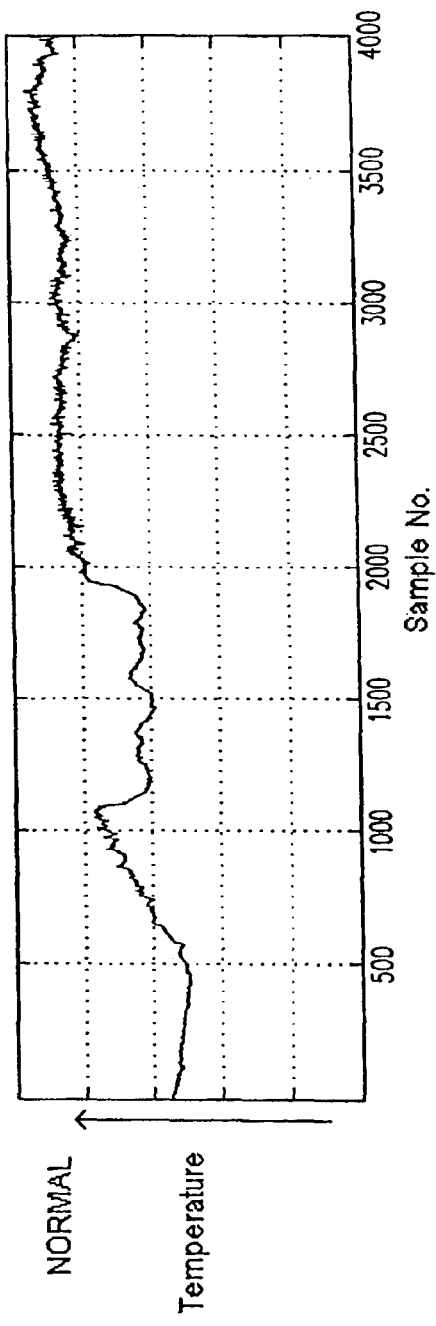
FIGS. 4 and 5 depict traces of normal and frozen temperature sensors.
Figure 5:
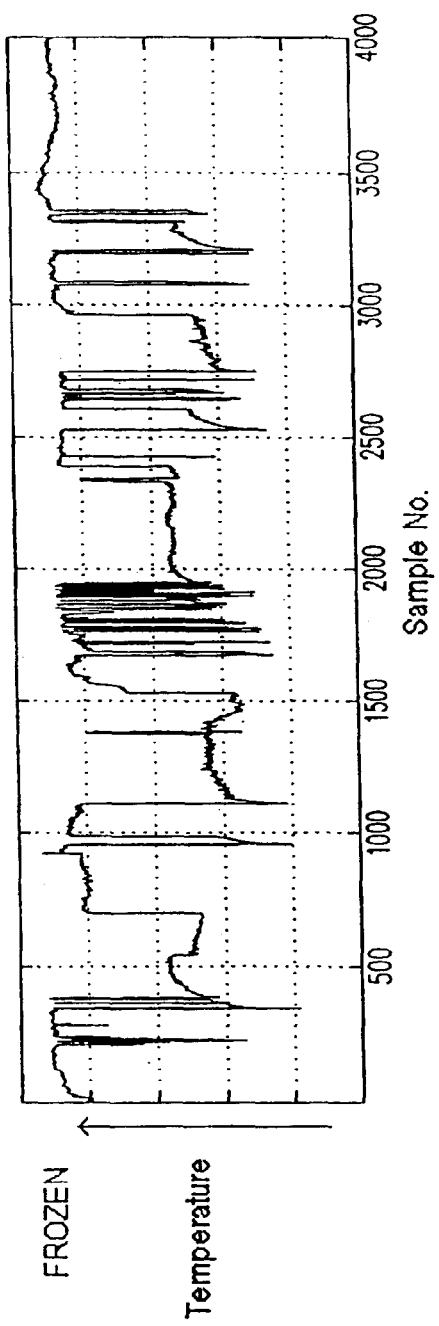

Referring to FIGS. 4 and 5, traces are shown for a normal and a frozen temperature sensor (a resistance thermocouple in this case), respectively. The x-axis represents sample numbers collected at a 1-minute frequency. As shown in the FIGS. 4 and 5, there is a marked difference between a normal and a malfunctioning temperature sensor, thereby making detection of a frozen temperature sensor rather easy.

Referring to FIGS. 6 and 7, the traces of the output of level sensor 54 are shown under normal and frozen conditions, respectively (the conclusion that the sensor was frozen was deduced from what happened later on in the process). The x-axis represents sample numbers collected at a 1-minute frequency. Unlike the temperature sensor traces shown in FIGS. 4 and 5, detecting problems in a level sensor is more difficult as there is very little difference between the normal and frozen conditions. To a casual observer, the trace under normal conditions appears to be more flat-lined. A small transient around sample numbers 500–700 in FIG. 7 provides contradictory evidence to the fact that the sensor is indeed frozen. This is because the frozen DP-cell may respond to changes in upstream or downstream static pressure changes, albeit incorrectly.

Figure 8:
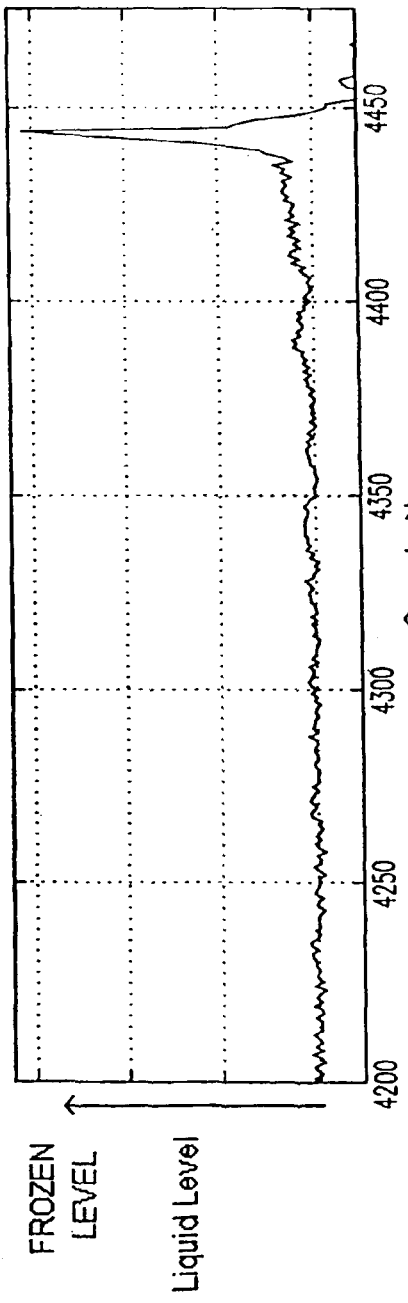
Figure 9:
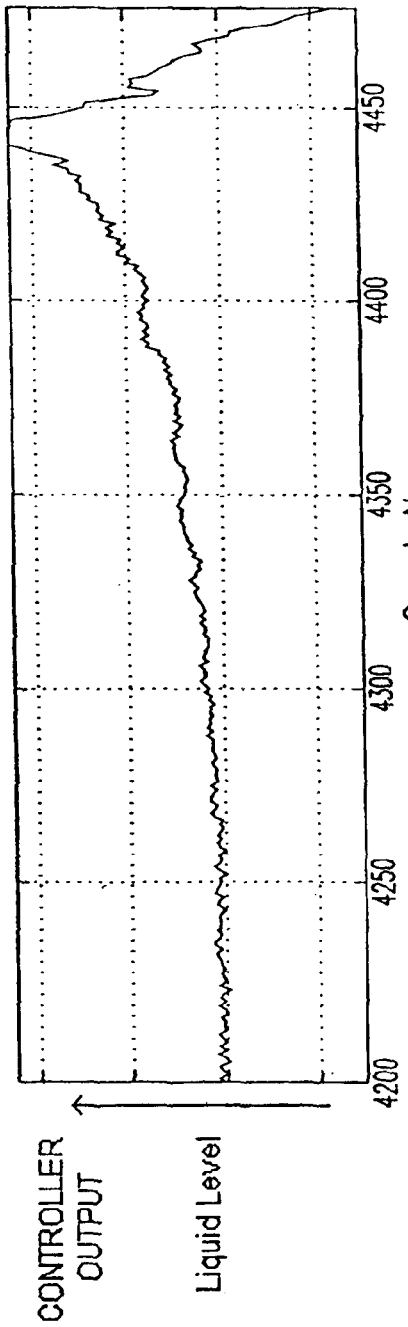

Referring to FIGS. 8 and 9, traces of the output of level sensor 54 and the output of level controller 56, respectively, show the subtlety of the frozen sensor detection problem. FIGS. 8 and 9 are continuations of FIGS. 6 and 7, respectively. From FIGS. 8 and 9, it is clear that level controller 56 starts to windup as a result of the frozen sensor around sample number 4250. This process continues and leads to a loss of level and subsequent process upset. It is at this point, that the operator realizes that the level sensor was frozen. This is a commonplace occurrence in the process industry, wherein an apparently small sensor problem leads to major upsets.

Figure 10:
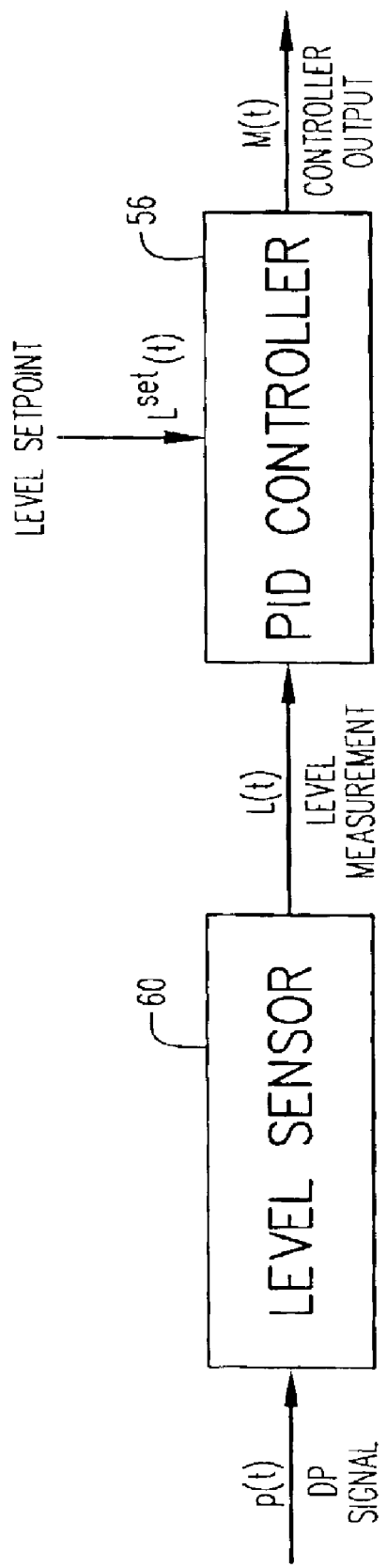
FIG. 10 is a schematic diagram showing more detail of the control system of FIG. 2.

Referring to FIGS. 3 and 10, a separate level sensor translator 60 is provided to translate or convert the output of sensor 54, which is the DP-cell signal $p(t)$. Level sensor translator 60 converts the differential pressure signal $p(t)$ into a level signal $L(t)$, which is provided to level controller 56. Level sensor translator may also include an analog to digital converter to convert level signal $L(t)$ to a digital signal for use by level controller 56. Level controller 56 then operates on the level signal $L(t)$ to provide an output signal $m(t)$. The controller output signal $m(t)$ is proportional to the error between the actual measurement $L(t)$ and the set point $Lset(t)$. Under a condition of a constant set point, the level-to-flow relationship can be described using the following set of model equations:

$$L(t)=f_1(p(t); m(t)=f_2(L(t)) \quad (3)$$

Unless stated explicitly, L(t), m(t) refer to appropriately scaled values, typically with respect to the nominal range of the instrument. Since pressure is a gross effect of randomly colliding atoms and molecules, the instantaneous value of p(t) consists of two components as given by equation (1). These fluctuations in the pressure introduce corresponding fluctuations in the level measurement and the controller output as given by:

$$L(t) = \bar{L}(t) + L'(t) \quad (4)$$

$$m(t) = \bar{m}(t) + m'(t) \quad (5)$$

The component $\bar{L}(t)$, $\bar{m}(t)$ is an ensemble average and corresponds to a net effect of measured/unmeasured disturbances acting on the process and user initiated set point changes. These disturbances are collectively called process factors herein. The rate of change of this component is relatively slow compared to the sampling rate $\Delta t$. The component $L(t)'$, $m(t)'$ is a net effect of turbulent flows and transducer noise. The rate of change of this component is relatively fast compared to the sampling rate. The method of the present invention monitors the variance introduced by process effects compared to that introduced due to turbulence effects. A frozen sensor is signaled by a drastic change in their relative proportions.

A test statistic $\theta(t)$ that monitors various statistical properties of these fluctuations is derived below. This test statistic forms the basis of either accepting or rejecting the frozen sensor hypothesis. Mathematically, the frozen level sensor test is formulated as:

Null hypothesis $H_0$: Sensor is frozen accept $H_0$: $\theta(t) > \delta_f$ \quad (6)

where, $\theta(t)$ is a function of L(t), m(t) and $\delta_f$ is the threshold for acceptance.

The method of the invention monitors the variance introduced by process factors and turbulence by comparing their statistical properties. This is done by applying a high-pass filter in the form of a first difference to the measurement signal. Although, the first difference may not completely remove the effect of process factors, it will reduce its influence considerably and thus make it statistically comparable to the variance introduced by turbulence. Secondly, the first difference has the effect of statistically amplifying the variance introduced by turbulence (The variance is doubled). Let $\Delta L(t)$ and $\Delta m(t)$ denote the first difference, which is defined as follows.

$$\Delta L(t) = L(t) - L(t-1) \quad (7)$$
$$= \{\bar{L}(t) + L'(t)\} - \{\bar{L}(t-1) + L'(t-1)\}$$
$$= \Delta \bar{L}(t) + \Delta L'(t)$$

where, t–1 denotes the instantaneous value at the previous sample. Similarly, $$\Delta m(t) = \Delta \bar{m}(t) + \Delta m'(t) \quad (8)$$

Let $S_L^2(t)$, $S_m^2(t)$ denote the variance calculated using N previous samples. Thus:

$$S_L^2(t) = var(\Delta L(t), N) \quad (9)$$

$$S_m^2(t) = var(\Delta m(t), N) \quad (10)$$

where, the var(·) of a uniformly sampled time series variable y(t) is defined by:

$$S_y^2(t) = \frac{1}{N-1}\left\{\sum_{i=0}^{N}(y(t-i))^2 - \left(\sum_{i=0}^{N}y(t-i)\right)^2\right\} \quad (11)$$

Suppose N is chosen such that statistically:

$$\sum_{i=0}^{N}\Delta L'(t-i) \to 0, \sum_{i=0}^{N}\Delta m'(t-i) \to 0, \quad (12)$$

In order to establish this criterion, with about 90% confidence, a minimum of 10 samples must be collected within Tmin/3 time windows, where Tmin is the smallest process time constant. For example, if the process time constant is of the order of an hour, then sampling every minute will satisfy the above criterion. For this example, 10 samples are collected every 20 minutes (one hour/3 time windows) so that at least one sample is collected every two minutes. Substituting equation (12) in the definition of S2, L(t) and S2 m(t) gives:

$$S_L^2(t) = S_{\bar{L}}^2(t) + S_{L'}^2(t) \quad (13)$$

$$S_m^2(t) = S_{\bar{m}}^2(t) + S_{m'}^2(t) \quad (14)$$

Equations (13) and (14) clearly show that, for an appropriate number of samples N and a sampling interval $\Delta t$, the variance of the first difference of a sampled times series measurement y(t) is composed of two components:

1. The first component, $S_{\bar{y}}^2(t)$, corresponds to a variance introduced as a result of process effects. In other words, over a window of N samples, $$S_{\bar{y}}^2(t)$$

represents the fraction of the variance that is accounted by process factors.

2. The second component, $S_{y'}^2(t)$, corresponds to a variance introduced as a result of turbulence and transmitter circuits. In other words, over a window of N samples, $S_{y'}^2(t)$, corresponds to a variance introduced as a result of turbulence and transmitter circuits. In other words, over a window of N samples, $S_{y'}^2(t)$ represents the fraction of the variance that is accounted by random effects like turbulence.

In addition to the physical interpretation, the two components are different mathematically. Although, the occurrence of process factors cannot be determined once they occur, the net effect on the process is systematic. The effect of turbulence, on the other hand, is random. This mathematical difference is exploited in the formulation of $\theta(t)$.

Define $X(t) = [S_L^2(t) \; S_m^2(t)]^T$ and the 2×2 covariance matrix cov X(t) as follows:

$$\text{cov } X(t) = \sum_{i=0}^{M} [X(t-i)X(t-i)^T] \quad (15)$$

where, M is called the frozen sensor detection window and M>>N. Typically, M is an order of magnitude larger than N.

Consider a principal component analysis (PCA) of the covariance matrix of equation (15). A PCA decomposition of cov X(t) gives:

$$[\Sigma(t) \; V(t)] = pca(\text{cov } X(t)) \quad (16)$$

Eigen Values: $\Sigma(t) = [\sigma_1(t) \; \sigma_2(t)]$
Eigen Vectors: $V(t) = [v_1(t) \; v_2(t)]$
Finally, define the test statistic $\theta(t)$ as follows:

$$\theta(t) = -\log\left(\frac{\sigma_1(t)}{\sigma_1(t) + \sigma_2(t)}\right) \quad (17)$$

At every instant, X(t) is made up of four components:

$$S_L^2(t), S_m^2(t),$$

$S_{L'}^2(t), S_{m'}^2(t)$, of which two of these components $$(S_L^2(t) \text{ and } S_m^2(t))$$

are due to process effects and the remaining two components $(S_{L'}^2(t)$ and $S_{m'}^2(t))$ are due to random turbulence effects. The singular values of the covariance matrix are a composite measure of these four components over the detection window M.

Consider the case such that the over the entire detection window M, $\Delta \overline{L}(t), \Delta \overline{m}(t) \approx 0$, thus making $$S\frac{2}{L}(t), S\frac{2}{m}(t) \to 0.$$

From the sensor model equation (4 & 5) we get, $$S_{m'}^2(t) \propto S_{L'}^2(t) \propto S_{p'}^2(t) \quad (18)$$

or $$m'(t) \propto L'(t) \propto p'(t) \quad (19)$$

That is, the sample-to-sample variation in p(t), and hence in L(t) and m(t), is solely due to random turbulence effects.

Now let us examine the covariance matrix under above mentioned condition.

$$\text{cov } X(t) = \sum_{i=0}^{M} \begin{bmatrix} (S_{L'}^2(t-i))^2 & S_{L'}^2(t-i)S_{m'}^2(t-i) \\ S_{L'}^2(t-i)S_{m'}^2(t-i) & (S_{m'}^2(t-i))^2 \end{bmatrix} \quad (20)$$

This makes cov X(t) singular ($\sigma_2(t) \to 0$) and $\theta(t) \to \infty$. This key result, upon which the frozen detection test is based, is re-stated formally as follows:

Theorem: Frozen sensor test statistic.
For level sensor translator 60 of FIG. 10, if $\bar{p}(t) \to 0$, then $\overline{L}(t), \overline{m}(t) \to 0$. The test statistic $\theta(t)$ is given by equation (17)$\to \infty$.

However, if the sensor were not frozen and was responding to process factors, each element of the covariance matrix will have contributions from $$S\frac{2}{L}(t) \text{ and } S\frac{2}{m}(t)$$

making it non-singular and resulting in a smaller value for $\theta(t)$. The theorem provides a sufficient condition under which a frozen sensor results in $$S\frac{2}{L}(t), S\frac{2}{m}(t) \to 0$$

and, hence, $\theta(t) \to \infty$.

The frozen sensor theorem is interpreted physically as: over the entire detection window M, there was insignificant contribution to the overall variance due to process effects. If M is chosen to be large enough, then this is very unlikely to occur, unless there is some loss in the sensor response. In other words, the detection window M is chosen to ensure that the process is subjected to a minimum of one disturbance within M$\Delta$t time interval. This puts a minimum bound on the detection window M. The question that needs to be answered before choosing M is: how often do process disturbances occur? A typical value of 4–6 times the dominant time constant is a good first guess.

The next question to be asked is whether the frozen detection theorem provides the necessary condition. A zero value for $$S\frac{2}{L}(t), S\frac{2}{m}(t) \to 0$$

does not necessarily imply that the sensor is frozen. Consider the following example of a uniform ramp y(t)=kt:

$$\Delta \bar{y}(t) = k\Delta t \neq 0, \text{ but } S\frac{2}{y}(t) = 0 \quad (21)$$

Therefore, the above mentioned trivial case needs verification before applying the frozen detection theorem.

Figure 11:
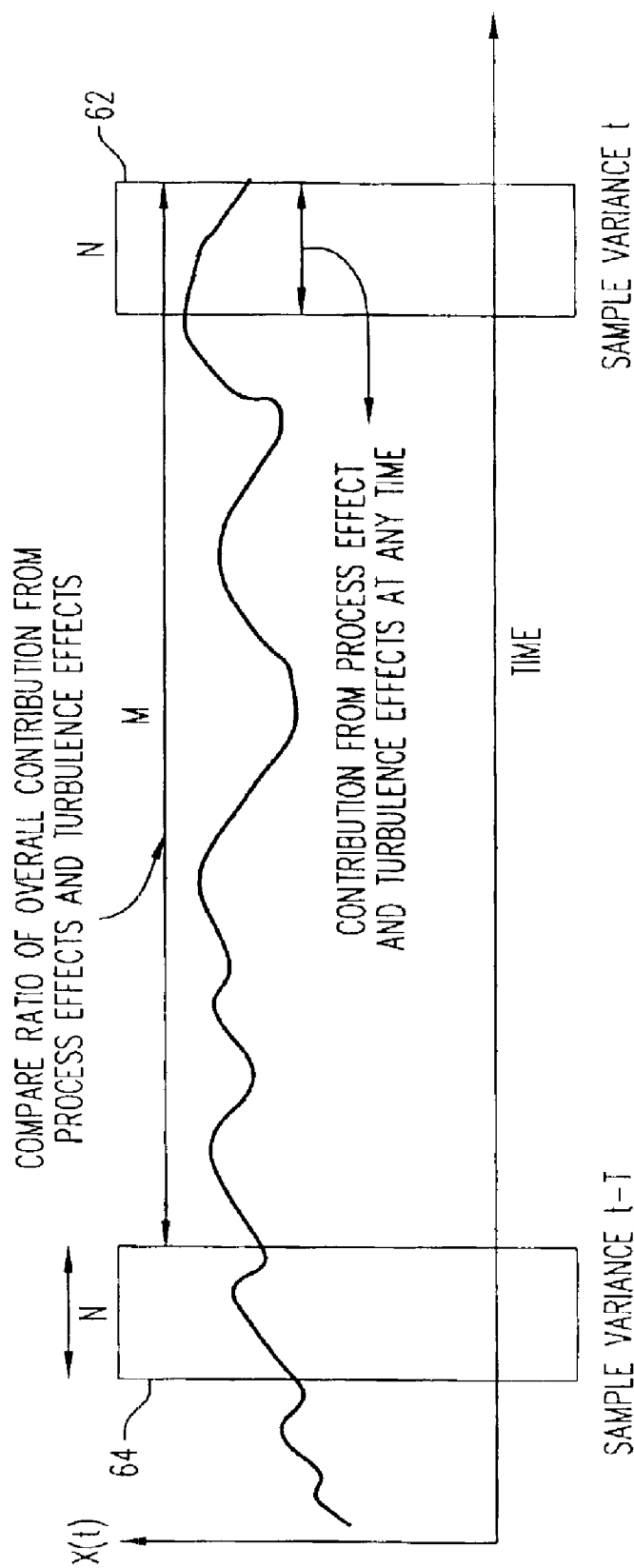
FIG. 11 depicts in graphical form a sample comparison step of the method of the present invention.

The principle of the detection algorithm is described graphically in FIG. 11.

Referring to FIG. 11, the test statistic $\theta(t)$ at current time t is calculated over a window 62 consisting of N sensor signal samples. This is compared with the baseline statistic developed based on a window 64 of samples taken at an earlier time T. As stated earlier, the comparison is of a ratio of a variance contribution due to process effects and a contribution due to turbulence effects with those established by the baseline. Ideally the baseline is established in a laboratory by careful calibration. However, in practice, the baseline value is preferably updated to take into account the natural aging of the physical device and associated pipes. Thus, when window 62 slides right upon arriving of a new reading, the baseline calculation is also updated using a exponential weighted moving average window scheme. Thus, the frozen sensor detection comparison is relative to baseline established T samples ago.

According to the method of the invention, the sliding baseline calculation is implemented using a recursive covariance matrix. The recursive formula is given by:

$$cov\ X(t) = \frac{M}{M-1} cov\ X(t-1) + \frac{1}{M-1} X(t)X(t)^T \qquad (22)$$

The ramp test given by equation (21) is done using a z-statistic, which tests whether the mean of the first difference is statistically non-zero.

Figure 12:
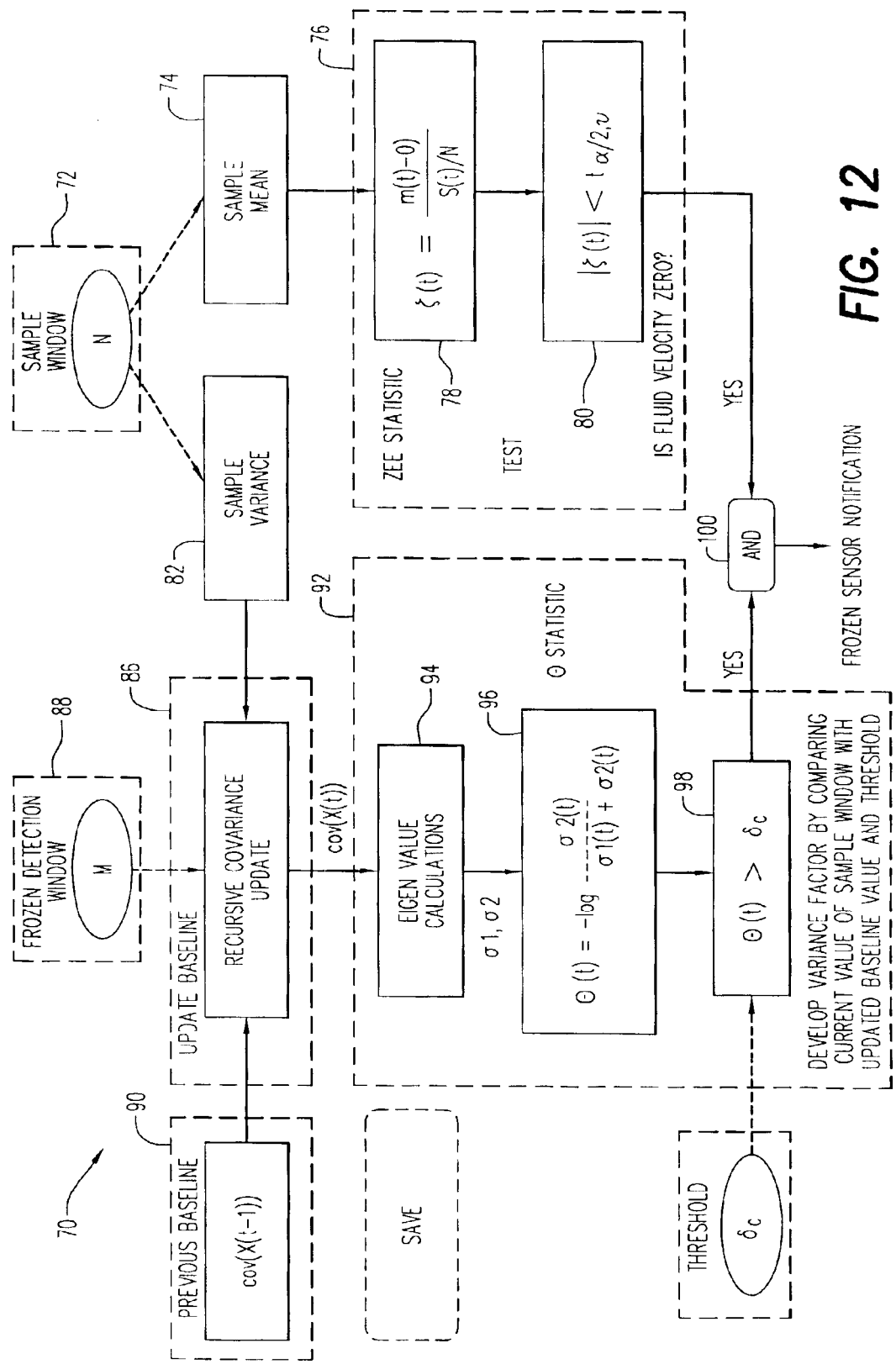
FIG. 12 is a flow diagram of the frozen sensor detection program of the control system of FIG. 2.
Figure 13:
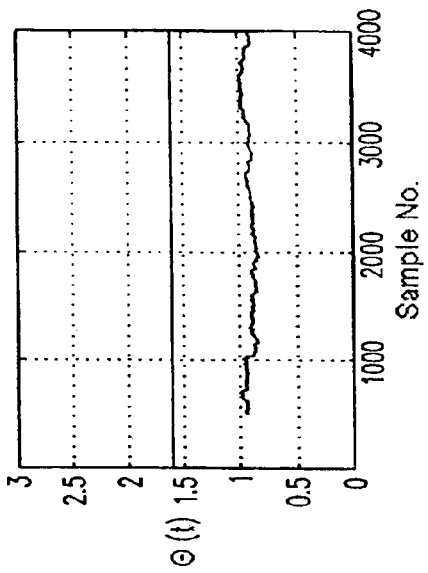
FIGS. 13–16 depict traces of the test statistic for normal sensors.
Figure 14:
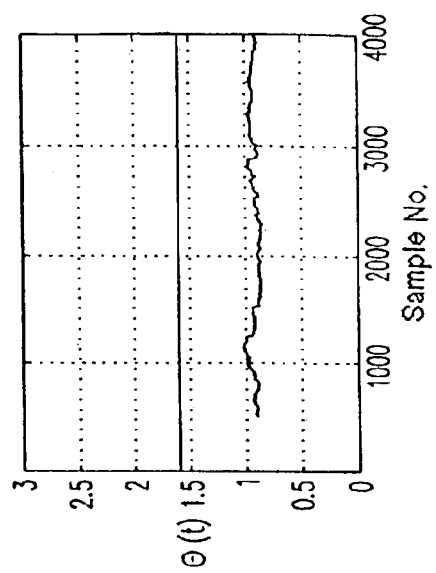
Figure 15:
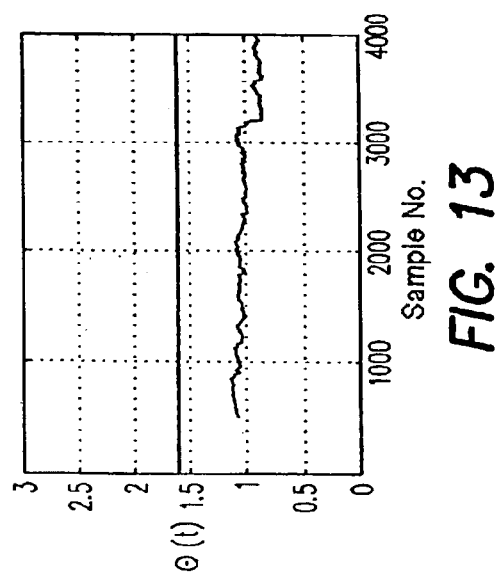
Figure 16:
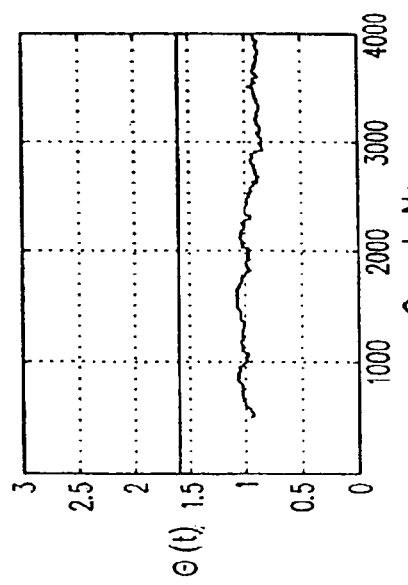

Referring to FIG. 12, a plugging detection program 70 at step 72 obtains a series of N samples of the DP-cell sensor. Consecutive windows advance by at least one sample. Step 74 calculates a mean of the N samples of a window. Step 76 tests the mean to determine a zero velocity condition. That is, step 76 determines whether the fluid velocity is zero. For this determination, step 78 generates a Z statistic and step 80 tests the Z statistic for the zero velocity condition.

Step 82 calculates the variance of the N samples collected over the window. Step 86 updates the baseline based on the output of step 82, a frozen detection window M provided by step 88 and a previous baseline provided by step 90 by using equation (22). Step 92 implements the frozen detection theorem. That is, it develops a variance factor using the most recent N values of the sensor signal, compares it with an updated baseline value and a specified threshold. If the result of this comparison exceeds the threshold, the variance factor or yes flag is generated. Step 94 develops the eigen values by using equation (16). Step 96 uses the eigen values in equation (17) to develop the test statistic θ(t). Step 98 compares the test statistic θ(t) with the threshold and if greater, generates the variance factor flag.

Step 100 gives a frozen sensor notice or alert when the zero fluid velocity condition and the variance factor flag are simultaneously developed.

During the frozen sensor development phase, the decisions about the following parameters are made:

1. The number of samples, N, used in the calculation of the sample variance given by equations (13) and (14)
2. The detection window size, M. As mentioned earlier, the larger the size, the less likely of false positives.
3. The detection threshold, $\delta_f$.

The method of the invention was applied to an example of a petrochemical plant, with a sampling rate of 1 min. For this example, N=10 and a detection window of M=50×N=500 samples was chosen. In order to determine the detection threshold, $\delta_f$, the test statistic θ(t) was calculated using data segments over a two year period for which the operator reported no anomalies.

FIGS. 13–16 show traces of the test statistic θ(t) for four normal modes of operation for the level sensor. As shown in FIGS. 13–16, θ(t) is relatively the same for the four traces. A threshold of 1.6 was chosen based on visual inspection. The traces of FIGS. 4–7 were developed from this same example. As shown in FIGS. 4–7 and discussed above, it was quite a challenge for the operator to detect a frozen sensor.

Figure 17:
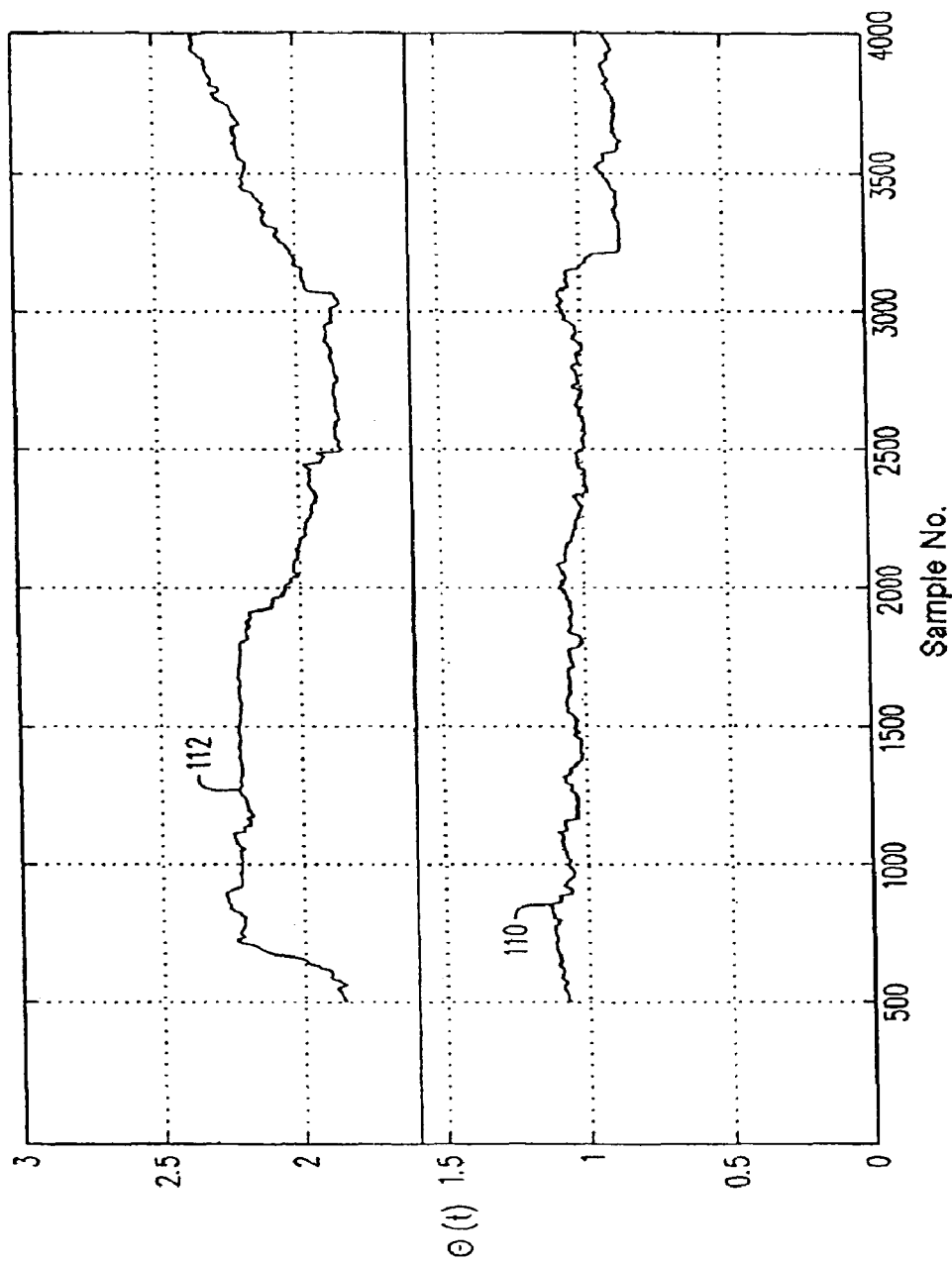
FIG. 17 depicts traces of the test statistic for a normal and a frozen sensor.

Referring to FIG. 17, traces 110 and 112 of the test statistic θ(t) for the same sensor is shown under normal and frozen conditions, respectively, for the same value of N, M. Trace 112 demonstrate that the test statistic θ(t) for the sensor is approaching a frozen condition as its magnitude for the frozen condition is an order of magnitude higher than trace 110 for a normal sensor (remember that the test statistic uses a logarithmic scale). Using a threshold of 1.6, the problem could have been detected at least a day in advance. As discussed earlier, frozen sensor detection is a very subtle problem. Heretofore, the operator was able to detect this only when the controller wound-up completely. In other words, for about a day, the process was operating with an incipient problem, oblivious to the operations team.

Figure 19:
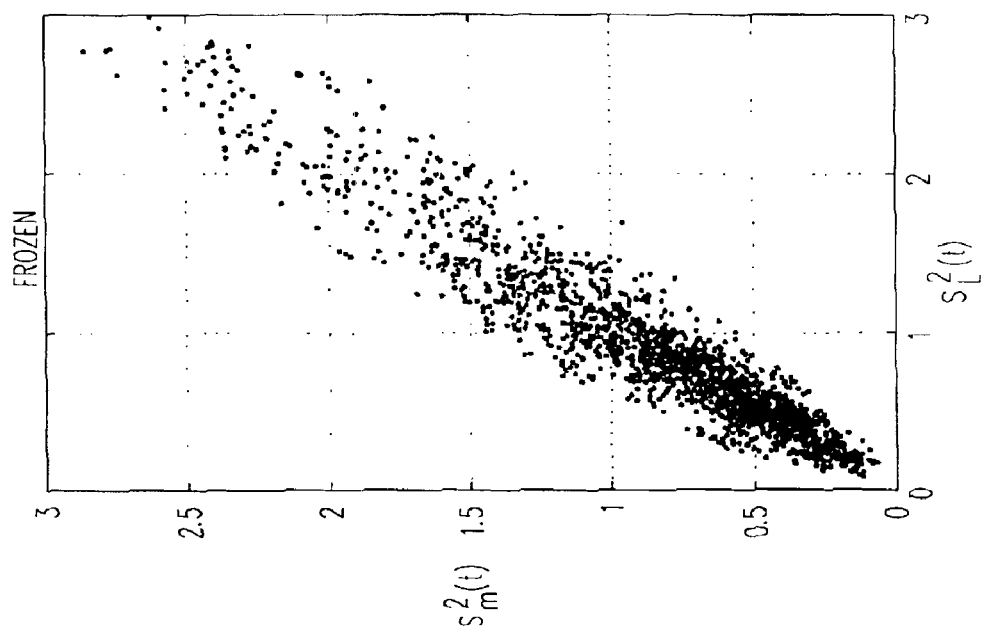
FIG. 19 depicts a scatter plot for a frozen sensor.
Figure 18:
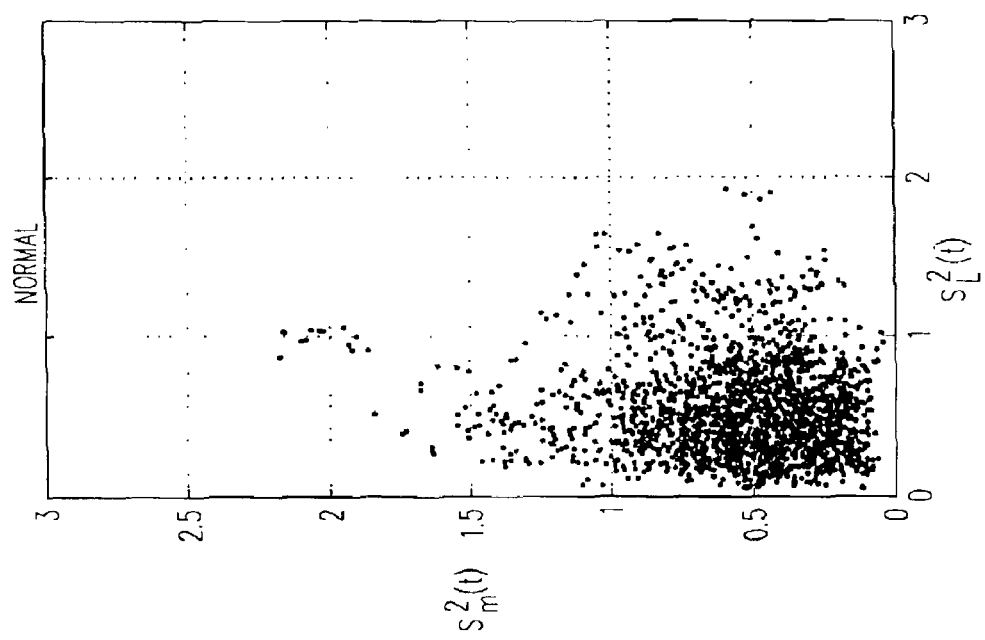
FIG. 18 depicts a scatter plot for a normal sensor.

As mentioned earlier, the method and control system of the present invention monitors the relative proportion between the variances introduced due to process effects and due to turbulence. If the sensor is responding to process effects, additional variance is added to the covariance matrix making it less singular. This is evident from the scatter plot shown in FIG. 18. There is no dominant direction along which the variance is scattered indicating that the covariance matrix is not singular. On the other hand, as explained earlier, the covariance matrix for a frozen sensor approaches singularity. This implies that there a dominant direction along which the variance can be explained, making the columns of the covariance matrix redundant. This can be seen in FIG. 19, which clearly shows a dominant direction and hence absence of any cross-directional scatter that is normally introduced when the sensor is responding to changes in the process factors.

The present invention having been thus described with particular reference to the preferred forms thereof, it will be obvious that various changes and modifications may be made therein without departing from the spirit and scope of the present invention as defined in the appended claims.

What is claimed is:

1. A method for detecting a plugging condition in lines that provide a signal in a system, said method comprising:
   (a) developing a variance factor from a sensor signal;
   (b) signaling an occurrence of said plugging condition in response to changes in said variance factor; and
   (c) processing said sensor signal to detect a zero mean velocity condition,
   wherein step (b) signals said occurrence of said plugging condition when said variance factor and said zero mean velocity condition are developed simultaneously.

2. The method of claim 1, wherein said lines are impulse lines of a differential pressure cell, wherein said sensor signal is proportional to pressure and velocity of a fluid, and wherein said variance factor measures the relative proportion between variance imposed by turbulence and variance imposed by process dynamics at a current time t, with respect to a baseline value and a predetermined threshold.

3. The method of claim 2, wherein step (a) uses a current value of said sensor signal, and wherein said baseline value is based on a value of said sensor signal that is earlier in time than said current value.

4. The method of claim 3, wherein said current value is based on a window of a number of samples of said sensor signal, wherein said window of said number of samples advances at least one sample at a time to provide a plurality of windows and wherein step (a) is repeated for each of said plurality of windows.

5. The method of claim 4, wherein said baseline value is dynamically updated based on a value of said baseline developed prior to said window of said current value.

6. The method of claim 5, wherein said baseline value is updated during each of said windows over a detection window that spans a plurality of said windows of said number of samples.

7. The method of claim 6, wherein said baseline value is updated using an exponentially weighted moving average of said plurality of sample windows.

8. The method of claim 4, wherein said number is selected to minimize the effect of slow process dynamics.

9. The method of claim 8, wherein said developing step (a) compares said baseline value and said threshold to a ratio of high frequency components of said sensor signal due to turbulence effects and to process effects so as to substantially eliminate effects due to working conditions of said system.

10. The method of claim 2, wherein said baseline value is dynamically updated.

11. A control system for detecting a plugging condition in lines that provide a sensor signal in a process system, said control system comprising:

a sensor that generates a sensor signal;

a controller that detects said sensor signal from said sensor and develops a variance factor from said sensor signal; and an indicator that signals an occurrence of said plugging condition in response to changes in said variance factor, wherein said controller processes said sensor signal to detect a mean velocity condition, and wherein said indicator signals said occurrence of said plugging condition when said variance factor and said zero mean velocity condition are developed simultaneously.

12. The control system of claim 11, wherein said lines are impulse lines of a differential pressure cell, wherein said sensor signal is proportional to pressure and velocity of a fluid, and wherein said variance factor measures the relative proportion between variance imposed by turbulence and variance imposed by process dynamics at a current time t, with respect to a baseline value and a predetermined threshold.

13. The control system of claim 12, wherein said baseline value is dynamically updated.

* * * * *